Patented Sept. 28, 1937

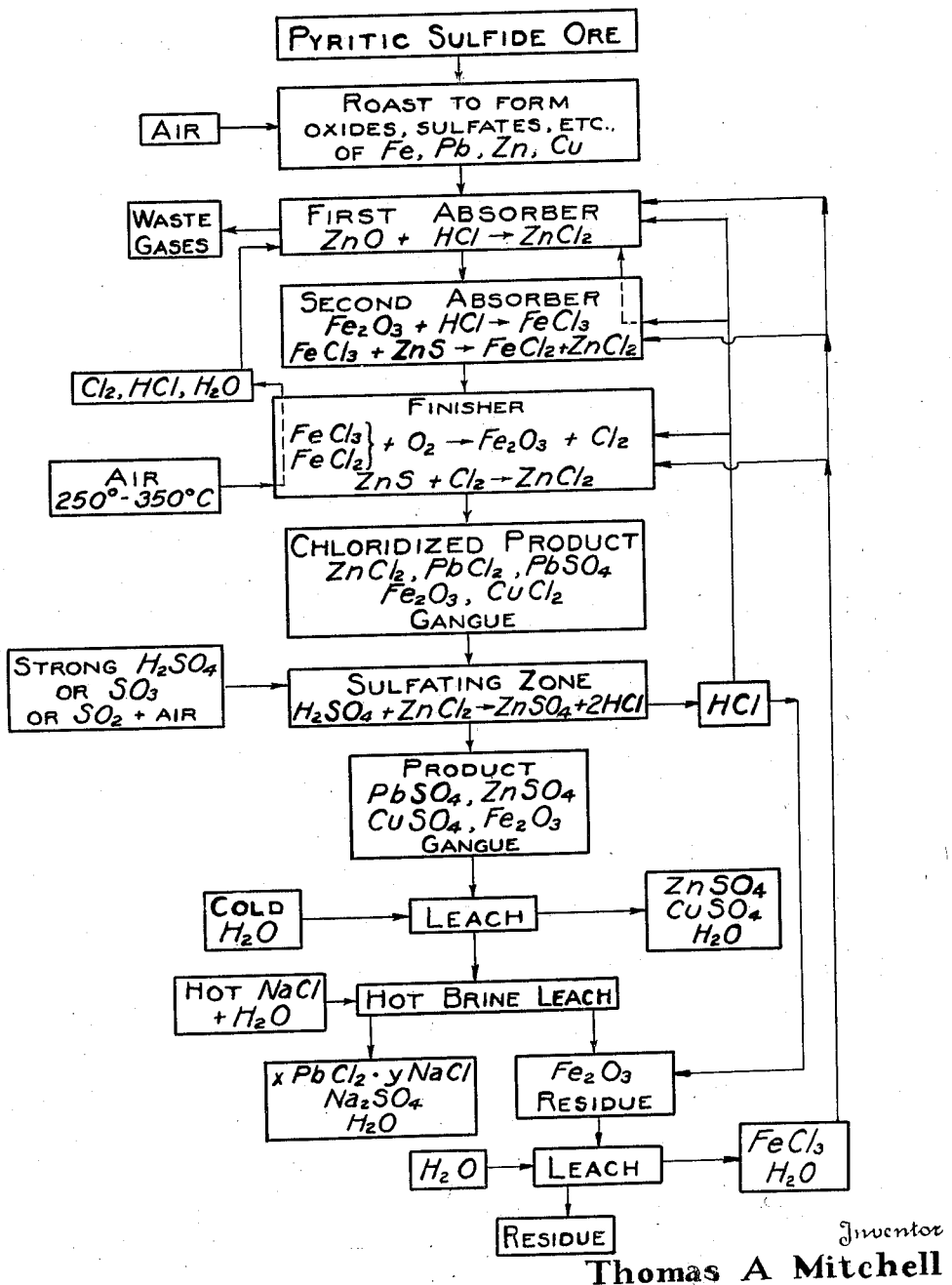

2,094,277

UNITED STATES PATENT OFFICE 2,094,277

METHOD OF SULPHATING THE ORE METAL VALUES OF A SULPHIDE ORE

Thomas A. Mitchell, Torrance, Calif., assignor to Hughes-Mitchell Processes, Incorporated, Denver, Colo., a corporation of Wyoming Application June 22, 1936, Serial No. 86,580

13 Claims. (Cl. 75—115)

This invention relates to a method of treating complex sulphide ore materials and recovering desired metal compounds as sulphates.

Various methods have been proposed for the recovery as sulphates of the different values found in a complex sulphide ore, such as by roasting the ore under conditions intended to oxidize the sulphides directly to sulphates or by first removing sulphide sulphur in a roasting operation and thereafter treating the ore metal oxide with sulphuric acid; but numerous problems have been presented by the formation of silicates, ferrites, ferrates or complex iron sulphur compounds during the roasting operation, which have not been readily converted to sulphates and have made it difficult to obtain an efficient recovery of the metal values.

In accordance with this invention, it has been found that the desired sulphates, which may be required for various industrial purposes, may be economically obtained if the roasted sulphide ore material is first subjected to a chloridizing operation whereby the refractory values are first converted to chlorides, after which the solubilized values may be readily converted to sulphates.

The primary object of this invention is, therefore, to so carry on the treatment of a complex sulphide ore that the desired metal values will appear in the final product as sulphates, but wherein the initial stages comprise the chloridization of the refractory compounds as well as the more easily converted metal oxides resulting from an initial roasting operation.

A further object is to provide an efficient method of treating a complex ore containing the sulphide of iron intermixed with the sulphides of zinc, lead, copper, silver, nickel or other desired and valuable metals, so that the iron may be left in an insoluble condition while the other metals are obtained largely as sulphates.

With these and other objects in view as well as apparent in the following disclosure, this invention resides in the combination of steps set forth hereinafter and covered by the appended claims.

This process comprises in general two main steps. The first is that of treating the values of an oxidized ore material, or a roasted sulphide ore, by means of a chloridizing operation which serves to solubilize not only the oxides but also such refractory or difficultly treated compounds as the residual sulphides or the ferrites, ferrates, silicates, etc. which cannot otherwise be readily or economically converted to water soluble compounds. The second step comprises treating the ore material, after the chloridization has been completed, with a sulphating reagent, and preferably anhydrous sulphuric acid or sulphur trioxide or equivalent reagent, and thereby converting the metal chlorides to the sulphates and releasing the chlorine element in a form which is useful in the initial chloridizing step. In the first stage, iron chloride will serve efficiently as a chloridizing reagent, as well as its decomposition products chlorine and hydrochloric acid; hence in treating such ores as contain iron compounds or to which they are added, the sulphuric acid is not added until after the iron chloride has served its purpose and the chloridization has been substantially completed. Moreover, it is desirable that the iron be present in the final sulphated material as the water insoluble ferric oxide, hence the chloridizing sulphating steps are preferably so controlled as to avoid forming iron sulphate to any material extent.

The drawing illustrates diagrammatically one preferred method of carrying out this invention and representative reactions thereof, although it is to be appreciated that many variations may be made in the procedure depending upon the type of chloridizing process employed.

In accordance with this invention, a complex sulphide ore is preferably roasted under low temperature oxidizing conditions, which serve to convert the major portion of the sulphides to oxides and sulphates, but which leaves the ore material in a pulverized non-sintered condition, whereby the values may be readily attacked by chloridizing reagents. Thereafter, the oxides of the roasted ore may be converted to chlorides by such reagents as hydrochloric acid and chlorine and the more refractory compounds are preferably chloridized by means of chlorine gas with or without the aid of iron chloride, which may be in either the ferrous or the ferric condition. During the final chloridization stage, if iron chloride is present, the material is heated with air to a temperature at which the iron chloride is decomposed with the resultant formation of ferric oxide and chlorine or hydrochloric acid gas. After this initial chloridization stage, the hot ore material is treated with strong sulphuric acid, which is preferably proportioned in amount to convert the valuable metal chlorides to sulphates but without sulphating the ferric oxide which is present. Thereafter, the ore metal sulphates are dissolved in aqueous solutions and suitably separated and recovered.

In order that the invention may be more fully understood it will be described specifically with reference to the chloridization process set forth in the U. S. patent of Mitchell 1,979,281 of November 6, 1934, but it will be apparent in view of the following explanation that this chloridizing process may be widely varied provided certain essential conditions are maintained. It will be assumed that the ore consists primarily of the sulphides of lead, zinc, copper, silver and iron, although it will be understood that the invention applies likewise to the treatment of other sulphide ores, such as a copper and nickel ore, as well as ores of these general types which contain various other valuable metal compounds.

In accordance with the preferred procedure, the ore is first roasted by standard methods and preferably under low temperature conditions which prevent sintering the ore to any material extent and with an excess of air present so that the iron may be oxidized to the ferric oxide condition while the zinc and lead sulphides are roasted to oxides and/or sulphates. The roasting operation is preferably carried on at as low a temperature as is feasible for burning off the major portion of the sulphide sulphur, and preferably autogenously if sufficient sulphide sulphur is present; but the reaction may, of course, be aided or carried on by means of an outside source of heat, such as a gas or oil flame. A considerable amount of residual sulphide sulphur, such as 5%, may be left in the roasted ore since the later chloridizing steps will take care of this. Because of this feature, it is possible to maintain the ore in a pulverulent and porous condition and it need not become sintered, as is likely to take place if a higher temperature is utilized in order to roast the ore to the maximum extent. The ore is first pulverized to a sufficiently fine condition for the purpose and preferably so that the major portion of it will pass through a screen of 100 meshes to the linear inch. Also, if necessary, iron sulphide, such as pyrite, or iron oxide may be added to the raw ore material in order to provide sufficient iron chloride for the later stages of the process, where it is a primary reagent. If desired, the roasting operation may be followed by a further reducing operation in which hydrogen gas or other suitable reducing agent is employed to convert some or all of the iron oxide to ferrous oxide or to $Fe_3O_4$, so that ferrous chloride may be formed and employed in the later stages of the process.

In accordance with the preferred method, the roasted ore is thereafter treated in a substantially dry and granular or pulverulent condition with a chloridizing reagent or reagents capable of converting not only the oxides but also the refractory values to chlorides. This is preferably accomplished, with or without the aid of iron chloride, in a series of steps involving the use of hydrochloric acid and/or chlorine gas. For this purpose, the roasted ore may be first conducted to a rotary tube or a shelf type of apparatus, herein termed the first absorber, where it is subjected to the action of a chloridizing gas and preferably the residual gases derived from other steps of the process which contain hydrochloric acid gas or chlorine. The reactions in the first absorber comprise largely the conversion of the zinc oxide to the chloride. The temperature (preferably between 80° and 110° C.) and the rate of gas flow are so maintained as to hold the ore material in a substantially dry condition or that which will prevent the zinc chloride from absorbing so much water of reaction as to form a syrupy mass which would prevent penetration of the ore material by the reagent gases. From the first absorber, the material is then passed through a valve to a second absorber of suitable construction where it is subjected to the action of strong hydrochloric acid gas in the absence of any large amount of air and under controlled temperature conditions which result in the formation of iron chloride, and preferably ferric chloride, from the iron and oxide present. The final temperature at the lower end of this absorber may be below 90° C. and thus cause the iron chloride to absorb water of reaction and form a crystalline hydrated product. It is found, as explained in the prior Mitchell patent, that during this stage, the ferric chloride tends to react directly, or in the presence of the hydrochloric acid gas, with the zinc sulphide and other refractory compounds which have not been previously chloridized and it is reduced to ferrous chloride with a consequent chloridization of the zinc compounds. The hydrochloric acid gas employed in this zone may be derived from the later sulphating step as will be explained. The residual hydrochloric acid gas may be passed to the first absorber and there used. It will be appreciated that the iron chloride may be added as a dry powder or in aqueous solution to one of the absorbers or the entrance end of the finisher, and especially if the ore being treated is not high enough in its iron content.

From this second absorber, the material then passes through a rotary valve, which prevents the passage of gases to the absorber, into a finisher zone where it meets a countercurrent of air initially heated to 250° to 350° C. or higher. The first result in this zone is to evaporate the water present in the ore material, which may be free water or combined as water of crystallization, and to cause it to escape with the residual gases from the top of the finisher to the first absorber where the hydrochloric acid and chlorine gases therein are employed in the chloridizing process. As the temperature of the descending ore material in the finisher increases, the ferric and ferrous chlorides present are decomposed by the heat and, in the presence of air supplied for the purpose at the lower end of the apparatus, nascent chlorine is formed together with ferric oxide. The nascent chlorine, being a powerful chloridizing agent serves to attack the residual sulphides, silicates, etc. which have not been chloridized, with the consequent completion of the chloridizing operation. The temperature at the lower end of this zone may be regulated as desired according to the nature of the ore material being treated, and this temperature and the amount of air passed into the lower end of the finisher zone are preferably such as to cause sufficient decomposition of the iron chloride and the formation of enough nascent chlorine to accomplish the desired chloridizing step. It however is to be noted that the temperatures of the different stages are so controlled as to prevent losses by volatilization and to insure that the ore metal values remain in situ so that they may be ultimately recovered by leaching operations. It is preferred that all of the iron chloride be dissociated so that it will be present solely as ferric oxide.

The finisher reactions may be carried on in the presence of water vapor with a resultant formation of hydrochloric acid gas from the chlorine released from the iron chloride. In that case, it is feasible for some types of ore, and particularly if the zinc content is low, to allow some water to recirculate over the ore being chloridized, as by condensation of the water vapor on the ore material at the upper end of the apparatus. It is to be observed that the chloridizing steps as above described are to be considered as involving the treatment of the ore in a substantially dry condition, irrespective of the amount of free water present on the ore particles, as distinguished from reactions carried on with the ore material suspended in an aqueous bath of a chloridizing reagent.

Also, if ferrous oxide, or $Fe_3O_4$, has been formed during roasting, this oxide may be converted to ferrous chloride by suitable reagents. For example, the roasted ore may be treated either with the acid gases as above described, or with a solution of a suitable reagent salt, such as $CaCl_2$, and with a current of $SO_3$ gas, or $SO_2$ and air, which react in the presence of the ore material to form ferrous chloride. Thereafter the ore material is heated to decompose the iron chloride as above explained. It may also be observed that the residual sulphide sulphur in the roasted ore is ultimately converted to sulphur dioxide or trioxide during the chloridization step, and especially by reaction with chlorine, and that various secondary reactions will take place. The main thing, however, is the formation of chlorides during this stage; but if sulphates remain, this is not undesirable in view of the ultimate end of the process.

The material coming from this finisher zone may comprise lead sulphate, lead chloride, zinc chloride, copper chloride, silver chloride, ferric oxide, and other valuable materials which may be present in the ore. The temperature of this material is in the neighborhood of 250° to 350° and while thus heated, it is passed directly to a further piece of apparatus for the sulphating operation. This apparatus may comprise a rotary inclined tube or a vertical cylindrical chamber having shelves over which the material is moved by a series of rake arms. This apparatus as well as the absorbers and finisher may be constructed, if desired, according to the disclosure in the U. S. patents to Mitchell 1,977,238 of October 16, 1934 and 1,979,280 of November 6, 1934, and the procedure there set forth may be here employed.

In the sulphating apparatus, the ore material is subjected to the action of strong sulphuric acid and preferably acid which is substantially anhydrous. The acid may be added as a spray onto the ore material at the entrance end of the sulphator. Under the conditions of the process, the strong sulphuric acid attacks various constituents of the hot ore material and in particular converts the chlorides of zinc, lead, copper and silver to the sulphates and forms hydrochloric acid gas. If the ore contained nickel sulphide, it may be likewise converted first to a chloride during the preliminary stages and then to a sulphate in this step.

The hydrochloric acid gas may be conducted, as indicated in the drawing, to any one of the chloridizing chambers. It may, for example, be sent to the second absorber without dilution with air, where the strong gas will serve to make the iron chloride. Any residual gas not used in that chamber will pass to the first absorber and there be taken up by the oxide. Likewise, this hydrochloric acid gas from the sulphator may be introduced directly into the first absorber or the finisher. Thus, this method makes it unnecessary to add any large amount of hydrochloric acid gas to the second absorber from an outside source, but of course a further amount of gas may be used as needed.

It is desirable that the iron oxide present in the finisher product be not converted to a sulphate, because the latter is soluble in water and not readily separated from the ore values. To this end, the ore material issuing from the finisher may be analyzed to determine its chloride content and only sufficient sulphuric acid is added to insure the conversion of substantially all of this chloride to the sulphate. This preferential treatment leaves the ferric oxide as such. If iron sulphate is formed, it is feasible, if desired, to maintain the temperature at the exit end of the sulphating apparatus sufficiently high, such as 650° C., to insure the decomposition of any iron sulphate that may be present and thus convert it to ferric oxide and release sulphide trioxide gas which further aids in the sulphating operation.

Instead of using sulphuric acid for the sulphating reagent sulphur trioxide may be employed. Also, one may use sulphur dioxide together with sufficient air for converting it to the trioxide. This conversion will take place readily in the presence of the ferric oxide acting as a catalyzer and under the temperature conditions prevailing in this zone. It, of course, is also feasible to employ sulphur under oxidizing conditions which will result in its burning to the dioxide and trioxide. Similarly, iron sulphide or other similar sulphur bearing reagents may be employed provided they are capable of releasing their sulphur and forming sulphur oxygen gases under conditions which are satisfactory for this stage of the process. These various sulphur compounds are to be considered as the equivalents of the sulphuric acid herein described and claimed. It is, however, preferred to employ strong sulphuric acid since this does not introduce air into the reaction chamber and thus dilute the chloridizing gas released from the ore material. Hence this sulphating step may be used for the formation of the strong hydrochloric acid gas which is desired in the second absorber where the ferric chloride is made. The temperature will be adjusted according to the nature of the reagent used and the end products desired. By having the ore material passed in a heated condition directly from the finisher to the sulphator, the reactions in the latter are aided and expedited.

It is also to be emphasized that the chloridizing step should be substantially completed before the sulphating reagent is added, since otherwise the presence of the sulphuric acid would prevent chloridization and particularly the formation of iron chloride, which is a primary reagent both in its direct attack on the refractory or difficultly chloridized compounds and in its release of nascent chlorine when decomposed in the presence of air. This process depends upon a substantially complete conversion of the desired metal values to chlorides in situ before any attempt is made to form sulphates therefrom. If sulphuric acid were added to the upper end of the finisher or after the iron chloride had been formed, this would produce iron sulphate and require a much higher temperature for its decomposition than does the iron chloride, with its attendant disadvantages. The finisher reaction depends upon the presence of iron chloride for solubilizing the refractory zinc compounds.

After the sulphating step, various hydrometallurgical methods may be adopted for separating and recovering the desired values. For example, the sulphated material may be transferred to a pachuca and there leached with cold water to dissolve such salts as zinc and copper sulphates which are soluble therein. Then after filtering and washing the residue, it may be leached by means of a hot sodium chloride brine to dissolve the lead and silver compounds therein. The brine may be a nearly saturated solution at about 75° C., which will dissolve the lead readily as a complex compound of the formula xPbCl₂.yNaCl. This lead may be precipitated from the hot solution, after separation from the residue, by means of various reagents such as sodium carbonate and sodium hydroxide and thus suitably recovered as a carbonate. The desired salts which are present in the solutions may of course be separated and treated by standard methods as is well understood in the art.

If desired, the hydrochloric acid need not be passed directly back to the chloridizing zones, but it may be used indirectly for treatment of a further amount of ore material. For example, the hydrochloric acid may be passed into contact with the ore residue containing the ferric oxide and there employed to form ferric chloride. This ferric chloride may be leached from the residue by means of water and a strong solution of ferric chloride thus obtained. This solution, or the ferric chloride crystals obtained by evaporating the solution, may be returned to either of the absorbers or the finisher for chloridizing further ore material. The ferric chloride solution may be sprayed for example, into the second absorber where it may react either with or without the aid of hydrochloric acid gas for chloridizing ore values therein. Also the ferric chloride solution or crystals may be introduced into the top of the finisher where direct reactions with the ore metal sulphides may take place, just as will result when the ferric chloride is introduced into the second absorber. In this finisher, as the temperature is increased the ferric chloride thus added will decompose and release chlorine gas and be reconverted to ferric oxide which will then go through the remainder of the cycle as above described.

It will also be appreciated that various other methods may be employed for utilizing the hydrochloric acid gas which has been thus released in the sulphating zone. This cyclic use of the chlorine element as hydrochloric acid and chlorine gas as well as in the ferric chloride reagent, becomes an important and economical part of the process. Hence, the primary reagent to be supplied for the chloridizing process is sulphuric acid, and this serves not only to form the necessary sulphates, but also to regenerate the hydrochloric acid employed in the chloridizing stage of the process. Also if desired, the hydrochloric acid may be used to treat iron oxide from a different source and apart from the ore residue in order to form the desired ferric chloride for use in the process. Furthermore, ferrous oxide may be treated with the hydrochloric acid for the purpose of making ferrous chloride and the latter may then be employed in the chloridizing stages as above indicated. Various other modifications of the invention will be apparent in view of the above disclosure.

Having thus described this invention, what I claim is new and desire to secure by Letters Patent is:

1. The method of sulphating the values of a complex oxidized pyritic sulphide ore comprising the steps of treating the oxidized ore with a reagent of the group consisting of hydrochloric acid gas, chlorine, iron chloride and combinations thereof under final oxidizing and temperature conditions which convert refractory ore metal values to chlorides and leave the iron in the ore material as ferric oxide, then after the completion of the chloridizing operation treating the chloridized material with a sulphating reagent capable of and proportioned for converting the ore metal chlorides to the sulphates, and finally dissolving the ore metal salts in aqueous solution and separating them from the residue.

2. The method of sulphating the values of an oxidized sulphide ore containing an ore metal oxide and a difficultly chloridized compound comprising the steps of treating the ore in a substantially dry condition with a chloridizing reagent of the group consisting of hydrochloric acid gas, chlorine, iron chloride and combinations thereof, while maintaining a final temperature at which any iron chloride present is converted to ferric oxide, and after the completion of the chloridizing stage treating the material with sulphuric acid proportioned for converting the chlorides of the metals other than iron to the sulphates, and ultimately dissolving the metal sulphates in aqueous solution and separating them from the iron oxide and the ore residue.

3. The method of claim 1 in which the ore material is finally chloridized during the first stage in the presence of air and at a temperature above 250° C. so that the iron is present as ferric oxide, and wherein the ore is treated, after the chloridizing stage and while the ore is in a heated substantially dry condition, with sulphuric acid proportioned to convert the chlorides to sulphates.

4. The method of solubilizing the values of a complex pyritic sulphide ore comprising the steps of roasting the ore under oxidizing conditions, treating the roasted ore in a substantially dry condition with a chloridizing agent and converting the oxides and chloridizable refractory metal compounds to chlorides, heating the material with air to insure that the iron is present in the chloridized product as ferric oxide, thereafter treating the ore material with sulphuric acid in amount proportioned to converting only the ore metal chlorides to the sulphates, and ultimately dissolving the same in aqueous solution and separating them from the residue.

5. The method of converting to sulphates the ore metal values of a complex sulphide ore comprising the steps of roasting the ore under low temperature oxidizing conditions, providing an intermixture of the ore material with iron chloride and heating the same with air to the temperature of decomposition of the iron chloride and thereby chloridizing a refractory ore metal compound, and subsequently treating the chloridized ore material with strong sulphuric acid and converting a metal chloride to the sulphate.

6. The method of treating a complex pyritic sulphide ore comprising the steps of roasting the ore under low temperature oxidizing conditions and providing a pulverulent non-sintered roasted ore material containing iron oxide, subjecting the roasted ore in a substantially dry condition to the action of gaseous chloridizing reagents and converting substantially all of the chloridizable constituents to chlorides, heating the material with air to decompose any iron chloride present and form ferric oxide and a chloridizing gas, thereafter treating the chloridized material with sulphuric acid proportioned in amount to convert the ore metal chlorides to sulphates without attacking the ferric oxide, and ultimately dissolving the sulphates in aqueous solution and separating them from the ferric oxide and ore residue.

7. The method according to claim 6 in which the ore material is heated to a temperature of at least 250° C. during the final chloridizing stage and the product is treated while hot with the sulphuric acid for the purpose of converting the chlorides to sulphates.

8. The method of sulphating the values of a complex sulphide ore comprising the steps of roasting the ore under low temperature oxidizing conditions, treating the roasted ore with a chloridizing reagent and providing an intermixture of the ore with iron chloride, heating the mixture with air to a final temperature above 250° C. and converting any iron chlorides present to ferric oxide, while forming chlorides of the chloridizable refractory values, thereafter treating the ore material with strong sulphuric acid proportioned in amount to sulphate all of the chlorides of the metals except iron, and finally separating the metal sulphates from the iron oxide and the ore residue.

9. The method of solubilizing a complex ore containing the sulphides of iron, zinc and lead comprising the steps of roasting the ore under low temperature oxidizing conditions and removing the major portion of the sulphide sulphur while forming ferric and zinc oxides, thereafter treating the material with chloridizing gases and forming zinc and iron chlorides from the corresponding oxides, ultimately heating the material with air to decompose the iron chloride and form ferric oxide and a chloridizing gas, circulating the latter over the ore material for chloridization thereof, thereafter treating the hot chloridized material with strong sulphuric acid proportioned in amount to convert the ore metal chlorides therein to sulphates but without materially attacking the iron oxide, while controlling the temperature and oxidizing conditions to insure that the major portion of the iron is present in the final product as ferric oxide, and thereafter dissolving the ore metal sulphates in aqueous solution and separating them from the iron oxide and ore residue.

10. The method of treating a complex sulphide ore comprising the steps of roasting the ore under oxidizing conditions, treating the roasted ore in a substantially dry condition with a chloridizing gas comprising hydrochloric acid and converting substantially all of the chloridizable values to chlorides, thereafter adding sulphuric acid to the ore material and converting metal chlorides to the sulphates, while forming hydrochloric acid gas, returning the hydrochloric acid gas to the chloridizing stage for chloridizing a further amount of roasted ore, and ultimately dissolving the metal sulphates in aqueous solution and recovering the same.

11. The method according to claim 9 in which the hydrochloric acid formed by reaction of the sulphuric acid with the ore metal chloride is conducted to a preceding stage and there employed to convert the ferric oxide to ferric chloride and for chloridizing other ore values.

12. The method according to claim 5 in which the hydrochloric acid formed by reaction of the sulphuric acid with the ore metal chloride is caused to react with iron oxide and form iron chloride and a further amount of ore material is cyclically treated with said iron chloride for chloridizing the same.

13. The method according to claim 5 in which the sulphuric acid treatment is limited so as to leave ferric oxide in the residue and comprising the steps of treating the residue with the hydrochloric acid formed by the reaction of the sulphuric acid with an ore metal chloride and thereby forming ferric chloride, dissolving the ferric chloride from the residue and treating a further amount of ore material with the ferric chloride for chloridizing the same.

THOMAS A. MITCHELL.